United States Patent [19]

Nissen et al.

[11] Patent Number: 4,590,219
[45] Date of Patent: May 20, 1986

[54] PROCESS FOR THE PREPARATION OF ELASTOMERIC MOLDED PARTS HAVING URETHANE OR URETHANE AND UREA GROUPS WITH IMPROVED LIGHT FASTNESS AND WEATHER RESISTANCE

[75] Inventors: Dietmar Nissen, Heidelberg; Matthias Marx, Bad Durkheim; Hans U. Schmidt, Ludwigshafen, all of Fed. Rep. of Germany

[73] Assignee: BASF Aktiengesellschaft, Ludwigshafen, Fed. Rep. of Germany

[21] Appl. No.: 488,038

[22] Filed: Apr. 22, 1983

[30] Foreign Application Priority Data

Apr. 29, 1982 [DE] Fed. Rep. of Germany ....... 3215908

[51] Int. Cl.[4] ...................... B29C 67/22; B29C 45/02; B29C 39/22; C08J 9/34
[52] U.S. Cl. .................................... 521/51; 264/45.3; 264/45.5; 264/53; 264/54; 264/328.6; 264/328.18; 264/331.19; 264/DIG. 83; 425/817 R; 521/172; 528/66
[58] Field of Search ................. 264/DIG. 83, 54, 45.3, 264/45.5, 53, 328.6, 328.18, 331.19; 425/817 R; 521/51

[56] References Cited

U.S. PATENT DOCUMENTS 3,975,128  8/1976  Schlüter .............................. 425/207
4,341,875  7/1982  Visger et al. ................ 264/DIG. 83

OTHER PUBLICATIONS

*Whittington's Dictionary of Plastics*, by Lloyd R. Whittington Stamford, Conn., Technomic, ©1968, Preface, pp. 131, 249.
Knipp, Ulrich "Plastics for Automobile Safety Bumpers" in *Journal of Cellular Plastics*, Mar./Apr., 1973, pp. 76–84.
Prepelka, David J. and James L. Wharton "Reaction Injection Molding in the Automotive Industry," in *Journal of Cellular Plastics*, Mar./Apr., 1975, pp. 87–98.
Becker, Walter E., edt., *Reaction Injection Molding*, New York, Van Nostrand Reinhold, ©1979, pp. 59, 60, 78–86 and 215–235.
BASF Elastogran Polyurethane Group Bulletin: "Puromat-Systematic Versatility: Modules Making for Programable RIM Efficiency," Mitterstrassweg, D–8021 Strasslach Bei München, Elastogran Maschinenbau GMBH–Elastogran Polyurethane–Group of BASF,~2/84, 18 pp.

*Primary Examiner*—Philip Anderson
*Attorney, Agent, or Firm*—Norbert M. Lisicki

[57] ABSTRACT

The invention relates to a process for the preparation of elastomeric molded parts having urethane or urethane and urea linkages which comprises reacting
(a) an organic polyisocyanate,
(b) a polyhydroxyl compound selected from the group consisting of
  (i) polyester polyols with molecular weights of 1000 to 3000 and hydroxyl numbers of 170 to 35 produced by polycondensation of organic dicarboxylic acids and a polyol mixture of at least 3 polyols;
  (ii) polyether polyols having terminal ester groups, molecular weights of 1000 to 8000 and hydroxyl numbers of 170 to 15; and
  (iii) mixtures thereof;
(c) a chain extender
wherein components (a) through (c) are processed according to reaction injection molding techniques in open or closed molds.

The reaction is preferably carried out as a one-shot process and may also be carried out in the presence of blowing agents (d), auxiliaries (e), and additives (e).

The non-cellular and/or microcellular elastomeric molded parts produced according to the method of this invention are particularly well suited for use in the automobile industry, for example, as bumper covers and body parts such as fenders, spoilers, wheel well expansions as well as engineering housing parts and runners. The cellular foams are used, for example, as shoe soles, armrests, headrests, safety coverings in the passenger compartment in automobiles as well as motorcycle and bicycle seats, seat cushions and cover layers in composite foams.

26 Claims, No Drawings

PROCESS FOR THE PREPARATION OF ELASTOMERIC MOLDED PARTS HAVING URETHANE OR URETHANE AND UREA GROUPS WITH IMPROVED LIGHT FASTNESS AND WEATHER RESISTANCE

BACKGROUND OF THE INVENTION

1. Field of the Invention

This invention relates to a process for preparing elastomeric molded parts having urethane groups or urethane and urea groups and to the elastomeric molded parts prepared thereby. Conventional ingredients are used to prepare the molded parts except for the polyhydroxyl compounds used.

2. Description of the Prior Art

The preparation of cross-linked plastics according to the isocyanate-polyaddition method is known. German Application No. 11 96 864 (U.S. Pat. No. 3,099,516) discloses that hydroxyl group-containing compounds and polyisocyanates are foamed for this purpose in the presence of blowing agents and catalysts. With a suitable choice of the ingredients flexible and rigid polyurethane elastomers as well as all intermediate modifications can be produced.

Elastomeric molded parts having urethane and optionally urea groups have satisfactory to very good mechanical properties. The dull surface of the molded parts on the other hand is not satisfactory. Particularly unsatisfactory is the light fastness and weather resistance which can be improved by adding expensive stabilizers on a short-term basis only since the stabilizers only delay the decomposition reactions.

SUMMARY

The subject invention relates to a process for preparing elastomeric molded parts, having urethane or urethane and urea groups, which comprises reacting
(a) an organic polyisocyanate,
(b) a polyhydroxyl compound selected from the group consisting of
  (i) polyester polyols with molecular weights of 1000 to 3000 and hydroxyl numbers of 170 to 35 produced y poly-condensation of organic dicarboxylic acids and a polyol mixture of at least 3 polyols;
  (ii) polyether polyols having terminal ester groups, molecular weights of 1000 to 8000 and hydroxyl numbers of 170 to 15; and
  (iii) mixtures thereof;
(c) a chain extender
wherein components (a) through (c) are processed according to reaction injection molding mixing techniques for casting in an open mold or injection into a closed mold.

The reaction is preferably carried out as a one-shot process and may also be carried out in the presence of blowing agents (d), auxiliaries (e), and additives (e).

The molded parts which are prepared according to the process of this invention have good mechanical properties with a markedly higher breaking elongation and a remarkably increased Graves tear strength. The surfaces of the molded parts are shiny and completely smooth. The surface is excellent when not coated, but it also considerably improves the quality of the coating when a coating is applied.

Particular emphasis should be placed on the high light fastness and weather resistance of the unstabilized molded parts produced according to this invention, the surface of which shows a dulling hardly noticeable to the eye after being weathered in the Xenon test 1200 for 400 hours.

The non-cellular and/or microcellular elastomeric molded parts produced according to the method of this invention are particularly well suited for use in the automobile industry, for example, as bumper covers and body parts such as fenders, spoilers, wheel well expansions as well as engineering housing parts and runners. The cellular foams are used, for example, as shoe soles, armrests, headrests, safety coverings in the passenger compartment in automobiles as well as motorcycle and bicycle seats, seat cushions and cover layers in composite foams.

DESCRIPTION OF THE PREFERRED EMBODIMENT

In order to teach those skilled in the art how to practice the invention, the following should be stated concerning the components (a) through (c) as well as the optional components (d) through (f).

Organic polyisocyanates (a) which can be used include aliphatic, cycloaliphatic, araliphatic and preferably aromatic multifunctional isocyanates. Detailed examples include alkylene diisocyanates with 4 to 12 carbon atoms in the alkylene radical such as 1,12-dodecanediisocyanate, 1,4-tetramethylene-diisocyanate and, preferably, 1,6-hexamethylene-diisocyanate; cycloaliphatic diisocyanates such as 1,3- and 1,4-cyclohexane diisocyanate as well as any desired mixtures of these isomers, 1-isocyanato-3,3,5-trimethyl-5-isocyanatomethyl-cyclohexane (isophorone diisocyanate), 2,4- and 2,6-hexahydrotoluenediisocyanate as well as the corresponding isomer mixtures, 4,4'-, 2,2'- and 2,4'-dicyclohexylmethane-diisocyanate as well as the corresponding isomer mixtures; and, preferably, aromatic di- and polyisocyanates such as 4,4'-, 2,4'- and 2,2'-diisocyanato-diphenylmethane and the corresponding isomer mixtures, 2,4- and 2,6-diisocyanato-toluene and the corresponding isomer mixtures, 1,5-diisocyanato-naphthalene, polyphenyl-polymethylene-polyisocyanates, 2,4,6-triisocynato-toluene and, preferably, mixtures of diphenylmethane and polyphenyl-polymethylene-polyisocyanates (crude MDI). The mentioned di- and polyisocyanates may be used individually or in the form of mixtures.

Frequently so-called modified multifunctional isocyanates, that is, products which are obtained by chemically reacting the above di- and/or polyisocyanates are also used. Examples for organic di- and polyisocyanates include carbodiimide group-containing polyisocyanates in accordance with German Pat. No. 10 92 007; allophanate group-containing polyisocyanates as they are described, for example, in British Pat. No. 994,890, the published document for Belgium Pat. No. 761,626, and Dutch Published Application No. 71 02 524; isocyanate group-containing polyisocyanates as described, for example, in German Pat. Nos. 10 22 789, 12 22 067 and 10 27 394 as well as German Published Application Nos. 19 29 034 and 20 04 048; urethane group containing polyisocyanates as they are described in the published document for Belgium Pat. No. 752,261 or U.S. Pat. No. 3,394,164; acylated urea group-containing polyisocyanates, for example, in accordance with German Pat. No. 12 30 778; biuret group-containing polyisocyanates, for example, in accordance with German Pat. No. 11 01 394 and British Pat. No. 889,050; polyisocyanates produced by trimerization reaction, for example, corresponding with the published document of Belgium Pat. No. 723,640; ester group-containing polyisocyanates such as they are mentioned, for example, in British Pat. Nos. 965,474 and 1,072,956, U.S. Pat. No. 3,567,765 and German Pat. No. 12 31 688.

Preferably used, however, are urethane group-containing polyisocyanates such as 4,4'-diphenylmethanediisocyanate or toluene diisocyanate modified with low molecular diols, triols or polypropylene glycols as well as the polyester polyols (i) and/or polyether polyols terminated with ester groups (ii) according to this invention, carbodiimide group and/or isocyanurate ring containing polyisocyanates such as those based on diphenylmethanediisocyanate and/or toluene diisocyanate and particularly toluene diisocyanates, diphenylmethane-diisocyanates, mixtures of diphenylmethane diisocyanates and polyphenyl-polymethylene-polyisocyanates (crude MDI) and mixtures of toluene diisocyanates and crude MDI.

Preferably used as polyhydroxyl compounds (b) which function as flexible segments in the elastomers are polyester polyols (i) with molecular weights of 1000 to 3000, preferably 1500 to 2500, and hydroxyl numbers of 150 to 35, preferably of 112 to 42, which are produced by polycondensation of organic dicarboxylic acids with a polyol mixture which contains at least 3 polyols, for example, 3 to 5 polyols, and preferably consists of 3 to 4 polyols.

Advantageously, the polyester polyols are predominantly linear, that is, they are difunctional in the sense of the isocyanate reaction or trifunctional on a maximum basis. If higher functional polyester polyols are used alone, or mixed with difunctional polyester polyols, they can be used only in such quantities that the functionality and/or the average functionality of the mixture is a maximum of 3, preferably 2.1 to 2.7. The polyester polyols may be used as individual components or in the form of mixtures.

Suitable polyester polyols may be produced, for example, from organic dicarboxylic acids with 2 to 12 carbon atoms, preferably, aliphatic dicarboxylic acids with 4 to 6 carbon atoms and the polyol mixtures to be used in accordance with this invention. Examples of dicarboxylic acids include aliphatic dicarboxylic acids such as succinic acid, glutaric acid, adipic acid, subaric acid, azelaic acid, sebasic acid, decane dicarboxylic acid, maleic acid and furmaric acid and aromatic dicarboxylic acids such as phthalic acid, isophthalic acid and terephthalic acid. The dicarboxylic acid may be used individually as well as in the form of mixtures. Instead of the free dicarboxylic acids, the corresponding dicarboxylic acid derivatives such as dicarboxylates of alcohols with 1 to 4 carbon atoms or dicarboxylic anhydrides may also be used. Preferably used are dicarboxylic acid mixtures consisting of succinic, glutaric and adipic acid in quantity ratios of, for instance, 20–35:35–50:20–32 parts by weight and, particularly, adipic acid.

Polyol mixtures of at least 3 polyols which are to be used in accordance with this invention may contain, for example diols such as ethylene glycol, 1,2-propane diol, trimethylene glycol, 1,4-butane diol, 1,5-pentane diol, 1,6-hexane diol, 1,8-octane diol, 1,4-bis-hydroxymethylcyclohexane, 2-methyl- and/or 2,2-dimethyl-trimethylene glycol, 3-methylpentane diol-1,5, diethylene glycol, dipropylene glycol and dibutylene glycol; triols such as glycerine, trimethylol ethane, trimethylol propane and trimethylol butane; and quadrols such as pentaerythritol.

Also suited as polyols are trifunctional and preferably difunctional polyoxyethylene polyols, polyoxypropylene polyols and polyoxyethylene-polyoxypropylene polyols with molecular weights of 106 to 2000, preferably of 150 to 1500, which are preferably used as mixtures with two low molecular diols such as ethylene glycol and 1,4-butane diol and wherein the polyester polyol polycondensation is carried out in such a manner that the polyoxyalkylene polyols in the polyester polyol are not bonded as terminal radicals.

Examples of the polyol mixtures include mixtures of 1,4-butane diol, 1,5-pentane diol, 1,6-hexane diol and glycerine and/or trimethylol propane, preferably in weight ratios of 10–50:30–60:8–35:2–15 parts; mixtures of 1,4-butane diol, 1,6-hexanediol, diethylene glycol and glycerine and/or trimethylolpropane, preferably in weight ratios of 10–50:15–45:15–65:2–15 parts; mixtures of 1,4-butane diol, 1,5-pentanediol, 1,6-hexanediol, optionally diethylene glycol and glycerine and/or trimethylolpropane, preferably in weight ratios of 5–50:20–60:8–35:0–65:2–15; and particularly mixtures of 1,4-butane diol, 1,5-pentane diol and 1,6-hexane diol, preferably in weight ratios of 15–30:40–55:15–30 parts; and mixtures of 1,4-butane diol, 1,6-hexane diol and 2,2-dimethyltrimethylene glycol and/or diethylene glycol, preferably in weight ratios of 20–60:20–40:20–40 parts.

The polyester polyols to be used in accordance with this invention may be prepared according to basically known methods by polycondensation of the organic dicarboxylic acids and the polyol mixture at temperatures from 100° C. to 250° C., preferably 130° C. to 220° C., optionally in the presence of known esterification catalysts such as organic compounds of titanium, vanadium or tin and/or water, stripping agents such as benzene, toluene, xylene or chlorobenzene for the azeotropic distillation of the condensed water, preferably under reduced pressure in the final phase of the polycondensation.

If the above-mentioned polyoxyalkylene polyols are also used as polyols, they are initially transformed into carboxyl group-containing polyesters with an excess of organic dicarboxylic acids and are then esterified with the remaining polyols and possibly additional dicarboxylic acids to form polyester polyols.

Also suited as polyhydroxyl compounds (b) are polyether polyols (ii) having terminal ester groups, molecular weights of 1000 to 8000, preferably of 1000 to 4000, and hydroxyl numbers of 170 to 15, preferably of 112 to 40. These polyether polyols having terminal ester groups are produced by esterification of the above-mentioned polyoxyethylene, polyoxypropylene and/or polyoxyethylenepolyoxypropylene polyols with lactones such as β-propiolactone, gamma-butyrolactone, gamma-valerolactone and, preferably, ε-caprolactone.

The polyester polyol (i) and polyether polyols having terminal ester groups (ii) which are usable as polyhydroxyl compounds (b) may be used individually or in the form of mixtures. They may also be mixed with commonly used polyether polyols and/or polyester polyols with the mixtures containing 10 to 900 parts by weight, preferably 40 to 300 parts by weight of commonly used polyether and/or polyester polyols per 100 parts by weight of polyester polyols (i) and/or polyols (ii).

Commonly used polyether or polyester polyols in the sense of this invention include commerically available polyoxyalkylene polyols with molecular weights of 2000 to 12,000, which are obtained by the polyaddition of one or more alkylene oxide with 2 to 10 carbon atoms, preferably 2 to 4 carbon atoms, in the alkylene radical, such as tetrahydrofuran, propylene oxide, 1,2- or 2,3-butylene oxide and, preferably, ethylene oxide and propylene oxide to a starter molecule containing in bonded form 2 to 8, preferably 2 to 3, reactive hydrogen atoms or commercially available polyester polyols with molecular weights of 800 to 3050, which are produced from the above-mentioned organic dicarboxylic acid and a polyol or a polyol mixture consisting of a maximum of two polyols.

Preferred starter molecules for the polyether polyol preparation include water, ammonium, alkanolamines such as ethanolamine, diethanolamine, N-methyl- and N-ethylethanolamine, N-methyl and N-ethyl diethanolamine and triethanolamine and particularly multifunctional, preferably bi- and/or trifunctional, alcohols such as ethylene glycol, 1,2- and 1,3-propane diol, diethylene glycol, dipropylene glycol, 1,4-butane diol, 1,6-hexamethylene glycol, glycerine, trimethylolpropane, pentaerythritol, sorbitol and sucrose.

Employed as chain extenders (c) in the method according to this invention are di- to tetrafunctional, preferably di- and/or trifunctional, araliphatic and/or preferably aliphatic polyols with molecular weights of 60 to 400, preferably 60 to 300. Representative examples include aliphatic and/or araliphatic diols with 2 to 14, preferably 2 to 6 carbon atoms, such as ethylene glycol, trimethylene glycol, 1,4-butane diol, 1,5-pentane diol, 1,6-hexanediol, 1,8-octanediol, 1,10-decanediol, diethylene glycol, dipropylene glycol and bis(2-hydroxyethyl)-hydroquinone; triols such as glycerine and trimethylolpropane; tetrols such as pentaerythritol; and low molecular hydroxyl group-containing polyoxyalkylene polyethers based on ethylene oxide and propylene oxide and the above-mentioned polyols or aliphatic diamines with molecular weights of 60 to 116 as starter molecules.

Also suited as chain extenders (c) are primary sterically hindered aromatic diamines which are substituted with an alkyl radical in at least one ortho position to the amino groups. Preferably used are those primary aromatic diamines which are liquid at room temperature and are completely or at least partially miscible with the polyhydroxyl compounds (b) and the polyols under processing conditions. Examples for formulae which prove to work well include alkyl substituted meta-phenylene diamines having formulas:

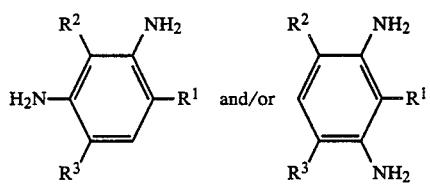

in which $R^1$ is a hydrogen atom or a linear or branched alkyl radical with 1 to 10, preferably 1 to 6 carbon atoms; and $R^2$ and $R^3$ are equal or different alkyl radicals with 1 to 3 carbon atoms such as a methyl, ethyl, propyl, or isopropyl radical. Particularly well suited are those alkyl radicals $R^1$ where the branching point is the $C^1$ carbon atom. Examples of alkyl radicals $R^1$ in addition to hydrogen are the methyl, ethyl, n- and iso-propyl, butyl, hexyl, octyl, decyl, 1-methyl-octyl, 2-ethyl-octyl, 1-methyl-hexyl, 1,1-dimethyl-pentyl, 1,3,3-trimethyl-hexyl, 1-ethyl-pentyl, 2-ethyl-pentyl and preferably the cyclohexyl, 1-methyl-n-propyl, tertiary butyl, 1-ethyl-n-propyl, 1-methyl-n-butyl and 1,1-dimethyl-n-propyl radicals.

Examples of alkyl substituted m-phenylenediamines include 2,4-dimethyl, 2,4-diethyl, 2,4-diisopropyl, 2,4-diethyl-6-methyl, 2-methyl-4,6-diethyl, 2,4,6-triethyl, 2,4-dimethyl-6-cylohexyl, 2-chlohexyl-4,6-diethyl, 2-cyclohexyl-2,6-diisopropyl, 2,4-dimethyl-6-(1-ethyl-n-propyl), 2,4 dimethyl-6-(1,1-dimethyl-n-propyl) and 2-(1-methyl-n-butyl)-4,6-dimethyl-phenylenediamine-1,3.

The compounds 3,3'-di- and 3,3',5,5'-tetra-n-alkylsubstituted 4,4'-diaminodiphenylmethanes such as 3,3'dimethyl, 3,3'5,5'-tetramethyl, 3,3'-diethyl, 3,3'5,5'-tetraethyl and 3,3'5,5'-tetra-n-propyl-4,4'-diaminodiphenylmethane have also proven to work well.

Advantageously used are diaminodiphenylmethanes having formula

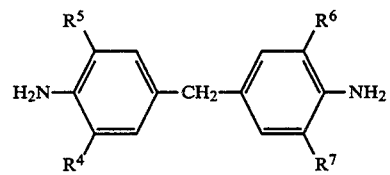

in which $R^4$, $R^5$, $R^6$ and $R^7$ are equal or different and are a methyl, ethyl, propyl, isopropyl, secondary butyl and tertiary butyl radical with at least one of the radicals having to be an isopropyl or secondary butyl radical. The 4,4'-diaminodiphenylmethanes may also be used as mixtures with isomers having the formulae:

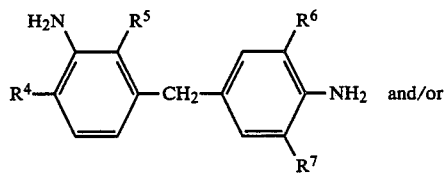

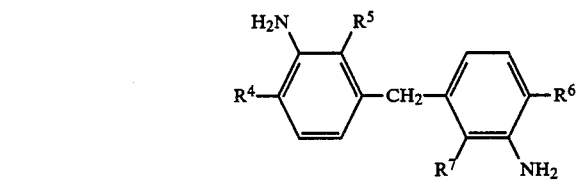

wherein $R^4$, $R^5$, $R^6$ and $R^7$ have the above-mentioned meaning.

Representative examples include: 3,3',5-trimethyl-5'isopropyl, 3,3',5-triethyl-5'-isopropyl, 3,3',5-trimethyl-5'-secondary butyl, 3,3',5-triethyl-5'-secondary butyl-4,4'-diaminodiphenylmethane, 3,3'-dimethyl-5,5'-diisopropyl, 3,3'-diethyl-5,5'-diisopropyl, 3,3'-dimethyl-5,5'-di-secondary butyl, 3,3'-diethyl-5,5'-di-secondary butyl, 3,5-dimethyl-3'5'-diisopropyl, 3,5-diethyl-3',5'-diisopropyl, 3,5'-dimethyl-3',5-di-secondary butyl, 3,5-diethyl-3', 5'-di-secondary butyl-4,4'-diamino-diphenylmethane, 3-methyl-3',5,5'-triisopropyl, 3-ethyl-3',5,5'- triisopropyl, 3-methyl-3',5,5'-tri-secondary butyl, 3,-ethyl-3', 5,5'-tri-secondary butyl-4,4'-diamino-diphenylmethane, 3,3'-diisopropyl-5,5'-di-secondary butyl, 3,5-diisopropyl-3',5'-di-secondary butyl, 3-ethyl-5-secondary butyl-3',5'-diisopropyl, 3-methyl-5-tertiary butyl- 3',5'-diisopropyl, 3-ethyl-5-secondary butyl-3'-methyl-5'-tertiary butyl, 3,3',5,5'-tetraisopropyl and 3,3',5,5'-tetrasecondary butyl-4,4'-diaminodiphenylmethane.

Preferably used are the following primary aromatic diamines: 2,4-diethyl, 2,4-dimethyl-phenyldiamine-1,3, 2,4-diethyl-6-methyl, 2,4-methyl-4,6-diethyl-phenylenediamine-1,3, 2,4,6-triethyl-phenylenediamine-1,3, phenylenediamine-1,5 and/or any desired mixtures of these isomeric diamines, 2,4-dimethyl-6-tertiary butyl, 2,4-dimethyl-6-isooctyl and 2,4-dimethyl-6-cyclohexylphenylenediamine-1,3 as well as 3,5-diemethyl-3',5'-diisopropyl and 3,3', 5,5,-tetraisopropyl-4,4'-diaminodiphenylmethane.

The polyols and primary aromatic diamines which are suitable as chain extenders (c) may be used individually or in the form of polyol or diamine mixtures. If mixtures of polyols and diamines are used as chain extenders (c), they advantageously contain 5 to 50, preferably 10 to 40, parts by weight of diamine or diamine mixture per 100 parts by weight of polyol or polyol mixture.

The di- to tetrafunctional aliphatic and/or araliphatic polyols and/or primary aromatic diamines (component c) are normally employed in amounts of 5 to 150 parts by weight, preferably 8 to 100 parts by weight, based on 100 parts by weight of polyhydroxyl compound (b) when used in accordance with this invention.

Blowing agents (d) which may optionally be used in a process of this invention include water which reacts with the isocyanate groups by forming carbon dioxide. The amount of water which is appropriately used is 0.5 to 2 percent by weight based on the weight of the polyhydroxyl compound (b).

Other blowing agents which can be used include low boiling liquids which evaporate under the influence of the exotheric polyaddition reaction. Suitable substances include liquids which are inert with respect to the organic polyisocyanate and have boiling points under 100° C. Examples of such preferably used liquids are halogenated hydrocarbons such as methylene chloride, trichlorofluoromethane, dichlorodifluoromethane, dichloromonofluoromethane, dichlorotetrafluoroethane and 1,1,2-trichloro-1,2,2-trifluoroethane.

Mixtures of these low boiling liquids and/or other substituted or unsubstituted hydrocarbons may also be used.

The most advantageous amount of low boiling liquid for the preparation of cellular molded parts depends upon the density to be achieved as well as possibly the use of water.

In general, amounts of 0.5 to 15 parts by weight based on 100 parts by weight of polyhydroxyl compound (b) provides satisfactory results.

Auxiliaries (e) and/or additives (f) may optionally also be incorporated in the reaction mixture. Examples include catalysts, surfactants, foam stabilizers, cell regulators, fillers, dyestuffs, pigments, flame retardants, hydrolysis protection agents, fungistats and bacteriostats.

Used as catalysts, particularly those compounds which greatly accelerate the reaction of the polyhydroxyl compound (b) and hydroxyl group containing chain extenders (c) with the polyisocyanates (a). Examples include organic metal compounds, preferably organic tin compounds such as tin(II)salts of organic carboxylic acids such as tin(II)-acetate, tin(II)octoate, tin(II)ethylhexoate and tin(II)-laurate and the dialkyltin(IV)salts of organic dicarboxylic acids such as dibutyl tin diacetate, dibutyl tin dilaurate, dibutyl tin maleate and dioctyltin diacetate. The organic metal compounds are used alone or, preferably, in combination with strongly basic amines. Examples include amindines such as 2,3-dimethyl-3,4,5,6-tetrahydropyrimidine or particularly monocyclic amidines according to German Patent Application No. 31 26 436.0, tertiary amines such as triethylamine, tributylamine, dimethylbenzylamine, N-methyl, N-cyclohexylmorpholine, N,N,N',N'-tetramethylethylenediamine, N,N,N'N'-tetramethylbutanediamine, pentamethyldiethylenetriamine, tetramethyldiaminoethylether, bis(dimethylaminopropyl)urea, dimethylpiperazine, 1,2-dimethylimidazole, 1-aza-bicyclo(3,3,0)octane and, preferably, 1,4-diazabicyclo-(2,2,2)octane and alkanol compounds such as triethanolamine, triisopropanolamine, N-methyl and N-ethyldiethanolamine and dimethylethanolamine.

Other possible catalysts include tris(dialkylaminoalkyl)-s-hexahydrotriazines, particularly tris(N,N-dimethylaminopropyl)-s-hexahydrotriazine; tetraalkyl ammonium hydroxides such as tetramethyl ammonium hydroxide; alkali hydroxides such as sodium hydroxide; and alkali alcoholates such as sodium ethylate and potassium isopropylate as well as alkali salts of long chained fatty acids with 10 to 20 carbon atoms and, optionally, OH groups in side positions. Preferably used are 0.001 to 5 percent by weight, particularly 0.05 to 2 percent by weight of catalyst and/or catalyst combination based on the weight of the polyhydroxyl compounds (b).

Suitable surfactants include those which support the homogenization of the raw materials and are possibly also suited to regulate the cell structure. These include, for example, emulsifiers such as the sodium salts of ricinoleic sulfates or of fatty acids as well as salts of fatty acids with amines, for example, oleic diethylamine or stearic diethanolamine, salts of sulfonic acids such as alkali or ammonium salts of dodecylbenzene or dinaphthylmethanedisulfonic acid and ricinoleic acid; foam stabilizers such as siloxane-oxyalkylene mixed polymers and other organo polysiloxanes, oxyethylated alkylphenols, oxyethylated fatty alcohols, paraffin oils, castor oil and/or ricinoleic acid esters and Turkish red oil and cell regulators such as paraffins, fatty alcohols and dimethylpolysiloxanes. The surfactants are usually employed in amounts of 0.01 to 5 parts by weight based on 100 parts by weight of polyhydroxyl compound (b).

Suitable fillers, particularly reinforcing fillers, are the basically known, commonly used organic and inorganic fillers, reinforcing agents, and substances for improving the wear resistance in paints, coatings, etc.

Specific examples include inorganic fillers such as silicatic minerals, for example, stratified silicates such as antigorite, serpentine, horn blends, amphibolite, chrisotile, talcum; metal oxides such as kaolin, aluminum oxides, titanium oxide and iron oxides, metal salts such as chalk, heavy spar and inorganic pigments such as cadmium sulfide, zinc sulfide as well as glass, asbestos meal and others. Preferably used are kaolin (China clay), aluminum silicate and coprecipitates of barium sulfate and aluminum silicate as well as natural and synthetic fibers, minerals such as asbestos, wollastonite and particularly glass fibers of various lengths which may be sized. Possible organic fillers include coal, melamine, collophonium, cyclopentadienyl resins; and graft polymers based on styrene-acrylonitrile which are produced by in situ polymerization of acrylonitrile-styrene mixtures in polyether polyols, olefinically unsaturated polyether polyols or olefinically unsaturated polyether polyol solvent mixtures and which are subsequently dispersed in the polyhydroxyl compounds (b) as well as filler dispersions where solvent-containing or aqueous polymer dispersions are mixed with the polyhydroxyl compounds (b) whereupon the solvent or water is removed.

The inorganic and organic fillers may be used individually or as mixtures. Preferably used are stable filler-polyester (i) dispersions or filler-polyether polyol having terminal ester groups (ii) dispersions where the fillers in the presence of the polyhydroxyl compounds (b) are crushed in situ with high local energy densities to a particle size of less than 7 microns and are simultaneously dispersed.

The inorganic and organic fillers are advantageously added to the reaction mixture in amounts of 0.5 to 50 percent by weight, preferably 1 to 40 percent by weight, based on the weight of the mixture of polyisocyanates and polyhydroxyl compounds.

Suitable flame retardants include, for example, tricresyl phosphate, tris-2-chloroethyl phosphate, trischloropropyl phosphate and tris-2,3-dibromopropyl phosphate.

In addition to the already mentioned halogencontaining phosphates, inorganic flame retardants such as aluminum oxide hydrate, antimony trioxide, aresenic oxide, ammonium polyphosphate and calcium sulfate as well as esterification products of low molecular polyols and halogenated phthalic acid derivatives may be used to render the molded parts flame resistant. In general, it has proved to be advantageous to use 5 to 50 parts by weight, preferably 5 to 25 parts by weight of the mentioned flame retardance per 100 parts by weight of polyhydroxyl compounds.

More detailed information related to other commonly used auxiliaries and additives is contained in the literature, for example, in the monograph by J. H. Saunders and K. C. Frisch, "High Polymers," vol. XVI, *Polyurethanes,* parts 1 and 2, (Interscience Publishers, 1962 and/or 1964).

For preparing the non-cellular or cellular elastomeric molded parts, the organic polyisocyanates, polyhydroxyl compounds and chain extenders are reacted in such quantities that the ratio of isocyanate groups to Zerewitinoff active hydrogen atoms bonded to OH or $NH_2$ groups is 1:0.85 to 1.25, preferably 1:0.95 to 1.15.

The cellular and preferably non-cellular elastomeric molded parts are produced according to the one-shot method using the known reaction injection technique. This mode of operation is described, for example, by Piechota and Röhr in "Integralschaumstoff," [Integral Foams], Carl Hanser Publishers, Munich and Vienna, 1975; D. J. Prepelka and J. L. Wharton in the *Journal of Cellular Plastics,* March/April 1975, pages 87–98, and U. Knipp in the *Journal of Cellular Plastics,* March/April 1973, pages 76–84.

When using a mixing chamber with several feed nozzles, the raw materials may be introduced individually and may be mixed intensively in the mixing chamber. It has proven to be particularly advantageous to work in accordance with the two-component method and to dissolve the chain extenders in the polyhydroxyl compounds and to combine the substances optionally with blowing agents, auxiliaries and additives to form component A and to use the organic polyisocyanates as component B.

The amount of the reaction mixture introduced into the mold is measured in such a manner that the resultant microcellular and/or non-cellular molded parts have a density of 0.8 to 1.4 grams per cubic centimeter, preferably 0.9 to 1.35 grams per cubic centimeter, and that the cellular molded parts have a density of 0.2 to 1.1 gram per cubic centimeter, preferably 0.25 to 0.7 gram per cubic centimeter. The starting components are introduced into the mold at a temperature of 15° C. to 80° C., preferably of 30° C. to 65° C. The mold temperature advantageously is 20° C. to 90° C., preferably 35° C. to 70° C. Under certain circumstances, it may be advantageous to use commonly applied mold release agents, for example, those based on wax or silicone in order to improve the demolding. The compression degrees for the preparation of the microcellular or cellular molded parts varies between 1.1 and 8, preferably between 2 and 8.

The following examples will illustrate in more detail how to practice the subject invention.

The parts referred to in the examples are parts by weight unless otherwise designated.

The following polyhydroxyl compounds and polyisocyanates were used for the preparation of elastomeric molded parts according to the method of this invention.

PES A: Polyester polyol with a hydroxyl number of 56 produced by polycondensation of adipic acid with a diol mixture of 1,4-butane diol, 1,5-pentane diol and 1,6-hexane diol in a weight ratio of 1:2:1.

PES B: Polyether-polyester polyol with a hydroxyl number of 56 produced by esterification of a polyoxyethylene glycol with caprolactone (Capa® 520 by Interox).

PES C: 1',4-butane diol-ethylene glycol adipate with a hydroxyl number of 56 (mole ratio of butane diol :ethylene glycol 1:2).

PE A: Block copolyether polyol based on glycerine, propylene oxide and ethylene oxide with a hydroxyl number of 56.

PE B: Polyether polyol based on trimethylolpropane and ethylene oxide with a hydroxyl number of 930.

Isocyanate A: Reaction product of 4,4'-diphenylmethanediisocyanate and dipropylene glycol with an isocyanate content of 23 percent by weight.

Isocyanate B: Reaction product of 4,4'-diphenylmethanediisocyanate and a diethylene glycol adipate with a hydroxyl number of 42 and an isocyanate content of 20.5 percent by weight.

Isocyanate C: Carbodiimide group containing 4,4'-diphenylmethane-diisocyanate with an isocyanate content of 29.5 percent by weight.

EXAMPLE 1

Component A consisted of a mixture of 63.8 parts of PES A, 35.0 parts 3,3',5,5'-tetraisopropyl-4,4'-diaminodiphenylmethane, 1.0 part of a 33 percent by weight solution of diazabicyclooctane in ethylene glycol, and 0.2 part dibutyl tin dilaurate.

Component B consisted of a mixture of Isocyanate B, 100 parts of component A, and 58.2 parts of component B, corresponding with an isocyanate index of 1.05. Components A and B were processed according to the RIM method into a closable mold using a high pressure metering machine of the Puromat ®80 type of Elastogram Machine construction.

Components A and B and the closable panel mold of aluminum (500×300×4 mm) were heated to 50° C.

EXAMPLE 2

The procedure was that described in Example 1 but 60.9 parts of component B were used corresponding to an isocyanate index of 1.10.

The following mechanical properties were measured on the resultant test panels which had a bulk density of 1.05 grams per cubic centimeter.

| Properties | Example 1 | Example 2 |
|---|---|---|
| Bending test* (seconds) | 20 | 20 |
| Breaking elongation (DIN 53 504) [%] | 350 | 420 |
| Tear strength (DIN 53 504) [N/mm$^2$] | 34 | 41 |
| Graves tear strength (DIN 53 515) [N/mm] | 130 | 126 |
| Hardness (DIN 53 503) [Shore D] | 57 | 58 |

*At this point, the test panels did not show any formation of cracks when bent by 180°

EXAMPLES 3a AND 3b

Component A consisted of a mixture of 70.73 parts of PES A, 0.5 part PE B, 19.0 parts ethylene glycol, 0.3 part of a 33 percent by weight solution of diazabicyclooctane in ethylene glycol, 0.26 part of a hexahydro-1-(3,4,5,6-tetrahydro-7H-azepin-2-yl)-1H-azepin-dibutyl tin dilaurate complex, 6.15 parts of a 20 percent by weight black pigment paste, and 3.07 parts methylene chloride.

Component B consisted of Isocyanate A. Using the RIM method and a high pressure metering machine of the Puromat 80 type by Elastogram Machine Construction, 100 parts of component A and 127 grams of component B, corresponding to an isocyanate index of 100, were processed into test panels using a component temperature of 50° C. and a closed aluminum mold (500×300×4 mm) heated to 50° C. The degree of compression was 1.7.

The mechanical properties compiled in the following table were measured on the test panel.

For Example 3a, the test panel remained untempered whereas it was tempered for one hour at 120° C. for Example 3b.

EXAMPLES 4a AND 4b

In Examples 4(a) and 4(b), component A was the same as in Examples 3a and 3b. Component B consisted of Isocyanate C. Using the methods described in Examples 3(a) and 3(b), 100 grams of component A and 100 grams of component B, corresponding to an isocyanate index of 100, were processed to test panels. The degree of compression was 2.0.

The test panel of Example 4a remained untempered whereas the sample according to Example 4b was tempered at 120° C. for one hour. The mechanical properties were compiled in the following table.

EXAMPLES 5a AND 5b

Component A consisted of a mixture of 70.73 parts of PES B, 19.00 parts of ethylene glycol, 0.5 part PE B, 0.3 part of a 33 percent by weight solution of diazabicyclooctane in ethylene glycol, 0.25 part of a hexahydro-1-(3,4,5,6-tetrahydro-7H-azepin-2-yl)-1H-azepin-dibutyl tin dilaurate complex, 6.15 parts of a 20 percent by weight black pigment paste and 3.07 parts methylene chloride.

Component B consisted of Isocyanate A. Using the methods described in Examples 3(a) and 3(b), 100 grams of component A and 127 grams of component B, corresponding to an isocyanate index of 100, were processed into test panels. The degree of compression was 1.6.

For Example 5a, the mechanical properties which were compiled in the following table were measured on an untempered test panel. For Example 5b, the test panel was tempered at 120° C. for one hour.

EXAMPLES 6a AND 6b

Component A was the same as in Examples 5a and 5b, 70.73 parts of PES B being replaced by 35.36 parts of PES B and 35.36 parts of PES C.

Component B was Isocyanate A. Using the methods described in Examples 3(a) and 3(b), 100 grams of component A and 127 grams of component B, corresponding to an isocyanate index of 100, were processed into test panels. The degree of compression was 1.7.

The mechanical properties measured on the test panels were compiled in the following table. For example 6a the test panel remained untempered whereas it was tempered at 120° C. for one hour, for example, 6b.

EXAMPLES 7a AND 7b

Component A was the same as in Examples 5a and 5b; however, instead of 70.73 parts of PES B, 35.36 parts of PES A and 35.36 parts of PE A were used.

Component B consisted of prepolymer A. Using the methods described in Examples 3(a) and 3(b), 100 grams of component A and 126 grams of component B, corresponding to an isocyanate index of 100, were processed into test panels. The degree of compression was 2.0.

The mechanical properties measured on the test panels were compiled on the following table. For Example 7a the test panel remained untempered whereas it was tempered at 120° C. for one hour for Example 7b.

TABLE

Mechanical Properties of the RIM Test Panels According to Examples 3a–7b

| Properties | 3a | 3b | 4a | 4b | 5a | 5b | 6a | 6b | 7a | 7b |
|---|---|---|---|---|---|---|---|---|---|---|
| Bulk density (g/cm$^3$) | 1.05 | 1.05 | 1.05 | 1.05 | 1.05 | 1.05 | 1.05 | 1.05 | 1.05 | 1.05 |
| Bending test* (sec) | 30 | 30 | 30 | 30 | 25 | 25 | 30 | 30 | 40 | 40 |
| Breaking elongation according to DIN 53504 (%) | 350 | 380 | 210 | 240 | 230 | 310 | 300 | 370 | 230 | 320 |
| Tear strength according to DIN 53404 (N/mm$^2$) | 29 | 25 | 28 | 30 | 32 | 32 | 28 | 29 | 24 | 25 |
| Graves tear strength according to DIN 53515 (N/mm) | 154 | 168 | 105 | 115 | 125 | 118 | 141 | 143 | 130 | 140 |
| Hardness according to DIN 53505 (Shore D) | 60 | 61 | 61 | 62 | 57 | 58 | 60 | 60 | 62 | 63 |
| Bending-E-modulus according | — | 420 | — | 450 | — | 250 | — | 300 | — | 460 |

TABLE-continued

Mechanical Properties of the RIM Test Panels According to Examples 3a–7b

| Properties | 3a | 3b | 4a | 4b | 5a | 5b | 6a | 6b | 7a | 7b |
|---|---|---|---|---|---|---|---|---|---|---|
| to DIN 53457 @ 23° C. (N/mm²) | | | | | | | | | | |

*At this point in time, the test panels do not show any crack formation when bent by 180° C.

The embodiment of this invention in which an exclusive privilege or property is claimed are defined as follows:

1. A process for the preparation of elastomeric molded parts having urethane or urethene and urea linkages which comprises reacting
    (a) an organic polyisocyanate,
    (b) polyester polyols with molecular weight of 1000 to 3000 and hydroxyl numbers of 170 to 35 produced by polycondensation of organic dicarboxylic acids and a polyol mixture consisting essentially of
        (1) 15 to 30 parts by weight of 1,4-butanediol,
        (2) 40 to 55 parts by weight of 1,5-pentanediol, and
        (3) 15 to 30 parts by weight of 1,6-hexanediol, and
    (c) a chain extender
wherein components (a) through (c) are processed by reaction injection molding mixing techniques for casting in an open or injection into a closed mold.

2. The process of claim 1 wherein a cellular molded part is produced by incorporating a blowing agent into the formulation to produce a molded part which has a cellular core and non-cellular external skin.

3. The process of claim 1 or 2 wherein a one-shot process is used.

4. The process of claim 3 wherein the polyester polyols (i) are produced by polycondensation of organic dicarboxylic acids and a polyol mixture consisting essentially of:
    (a) 20 to 60 parts by weight of 1,4-butanediol,
    (b) 20 to 40 parts by weight of 1,6-hexanediol, and
    (c) 20 to 40 parts by weight of 2,2-dimethylpropanediol-1,3 and/or diethylene glycol.

5. The process of claim 1 wherein adipic acid is used as organic dicarboxylic acid for the preparation of polyhydroxyl compounds (b).

6. The process of claim 3 wherein compound (b) is mixed with conventional polyether polyols, polyester polyols, or mixtures thereof.

7. The process of claim 6 wherein 10 to 900 parts by weight of commonly used polyether polyols, polyester polyols or mixtures thereof are used per 100 parts by weight of polyhydroxyl compound (b).

8. The process of claim 3 wherein 5 to 150 parts by weight of chain extenders (c) are used per 100 parts by weight of polyhydroxyl compounds (b).

9. The process of claim 9 wherein the equivalency ratio of isocyanate groups of the polyisocyanates (a) to Zerewitinoff active hydrogen atoms bonded to OH— or OH— and NH₂ groups of components (b) and (c) is 1:0.85 to 1.25.

10. The process of claim 9 wherein sterically hindered primary aromatic diamines are used as chain extenders (c).

11. The process of claim 3 wherein auxiliaries and/or additives are additionally used for the preparation of the molded parts.

12. The process of claim 1 wherein the noncellular molded parts have a density of 0.8 to 1.4 grams per cubic centimeter and are produced under compression.

13. The process of claim 2 wherein the molded parts with cellular core and noncellular external skin have an overall density of 0.2 to 1.2 grams/cubic centimeters and are produced under compression.

14. An elastomeric molded part prepared in accordance with the process of claim 1.

15. An elastomeric molded part prepared In accordance with the process of claim 2.

16. An elastomeric molded part prepared in accordance with the process of claim 3.

17. An elastomeric molded part prepared in accordance with the process of claim 4.

18. An elastomeric molded part prepared in accordance with the process of claim 5.

19. An elastomeric molded part prepared in accordance with the process of claim 6.

20. An elastomeric molded part prepared in accordance with the process of claim 7.

21. An elastomeric molded part prepared in accordance with the process of claim 8.

22. An elastomeric molded part prepared in accordance with the process of claim 9.

23. An elastomeric molded part prepared in accordance with the process of claim 10.

24. An elastomeric molded part prepared in accordance with the process of claim 11.

25. An elastomeric molded part prepared in accordance with the process of claim 12.

26. An elastomeric molded part prepared in accordance with the process of claim 13.

* * * * *

UNITED STATES PATENT AND TRADEMARK OFFICE
CERTIFICATE OF CORRECTION

PATENT NO. : 4,590,219

DATED : May 20, 1986

INVENTOR(S) : DIETMAR NISSEN, MATTHIAS MARX and HANS U. SCHMIDT

It is certified that error appears in the above-identified patent and that said Letters Patent is hereby corrected as shown below:

Column 14, Claim 9, line 1, change the process of claim 9 to the process of claim 8.

Signed and Sealed this

Ninth Day of September 1986

[SEAL]

Attest:

DONALD J. QUIGG

Attesting Officer

Commissioner of Patents and Trademarks